United States Patent
Ichimiya

(10) Patent No.: US 8,493,497 B2
(45) Date of Patent: Jul. 23, 2013

(54) FOCUS DETECTION APPARATUS WITH WEIGHTING OF PIXEL OUTPUTS

(75) Inventor: Takashi Ichimiya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/000,136

(22) PCT Filed: Jul. 17, 2009

(86) PCT No.: PCT/JP2009/063298
§ 371 (c)(1),
(2), (4) Date: Dec. 20, 2010

(87) PCT Pub. No.: WO2010/010957
PCT Pub. Date: Jan. 28, 2010

(65) Prior Publication Data
US 2011/0102663 A1    May 5, 2011

(30) Foreign Application Priority Data
Jul. 25, 2008    (JP) ................. 2008-192685

(51) Int. Cl.
*H04N 5/232* (2006.01)
(52) U.S. Cl.
USPC ............... 348/345; 348/294; 348/340
(58) Field of Classification Search
USPC ........................ 348/294, 340, 345
See application file for complete search history.

(56) References Cited

U.S. PATENT DOCUMENTS

| 5,532,781 | A | 7/1996 | Utagawa et al. |
| 5,955,753 | A | 9/1999 | Takahashi |
| 6,442,345 | B1 | 8/2002 | Kindaichi |
| 6,819,360 | B1 | 11/2004 | Ide et al. |
| 6,829,008 | B1 | 12/2004 | Kondo et al. |
| 7,154,547 | B2 | 12/2006 | Oda |
| 7,536,094 | B2 | 5/2009 | Ichimiya |
| 2003/0011693 | A1 | 1/2003 | Oda |
| 2003/0086008 | A1 | 5/2003 | Nagano |
| 2007/0002149 | A1 | 1/2007 | Oda |
| 2008/0143858 | A1* | 6/2008 | Kusaka ............... 348/294 |

FOREIGN PATENT DOCUMENTS

| EP | 1936955 A | 6/2008 |
| JP | 64-80920 A | 3/1989 |
| JP | 2-244020 A | 9/1990 |

(Continued)

OTHER PUBLICATIONS

Sep. 1, 2009 International Search Report and Written Opinion in PCT/JP2009/063298.

(Continued)

*Primary Examiner* — Usman Khan
(74) *Attorney, Agent, or Firm* — Fitzpatrick, Cella, Harper & Scinto

(57) ABSTRACT

The invention provides a focus detection apparatus comprising: an image sensor configured to convert an object image, the image sensor having a focus detection pixel for receiving a light beam that has passed through a partial area, which is a division of an exit pupil of an optical system for forming an object image; addition unit configured to multiply outputs of a plurality of the focus detection pixels included in a predetermined area of the image sensor by a weighting coefficient corresponding to a position of the focus detection pixel, and perform addition; and defocus amount calculation unit configured to calculate a defocus amount based on a pair of phase-difference detection signals generated based on an output of the addition unit.

2 Claims, 19 Drawing Sheets

FOREIGN PATENT DOCUMENTS

| | | |
|---|---|---|
| JP | 4-147206 A | 5/1992 |
| JP | 6-308379 A | 11/1994 |
| JP | 9-46596 A | 2/1997 |
| JP | 10-319311 A | 12/1998 |
| JP | 11-258489 A | 9/1999 |
| JP | 2000-156823 A | 6/2000 |
| JP | 2000-292686 A | 10/2000 |
| JP | 2000-330001 A | 11/2000 |
| JP | 2003-32694 A | 1/2003 |
| JP | 2003-195151 A | 7/2003 |
| JP | 2005-148091 A | 6/2005 |

OTHER PUBLICATIONS

Supplementary European Search Report, dated Sep. 28, 2011, in related European Application No. 9800471.

Office Action dated Aug. 27, 2012, in Japanese Patent Application No. 2008-192685.

\* cited by examiner

F I G. 3
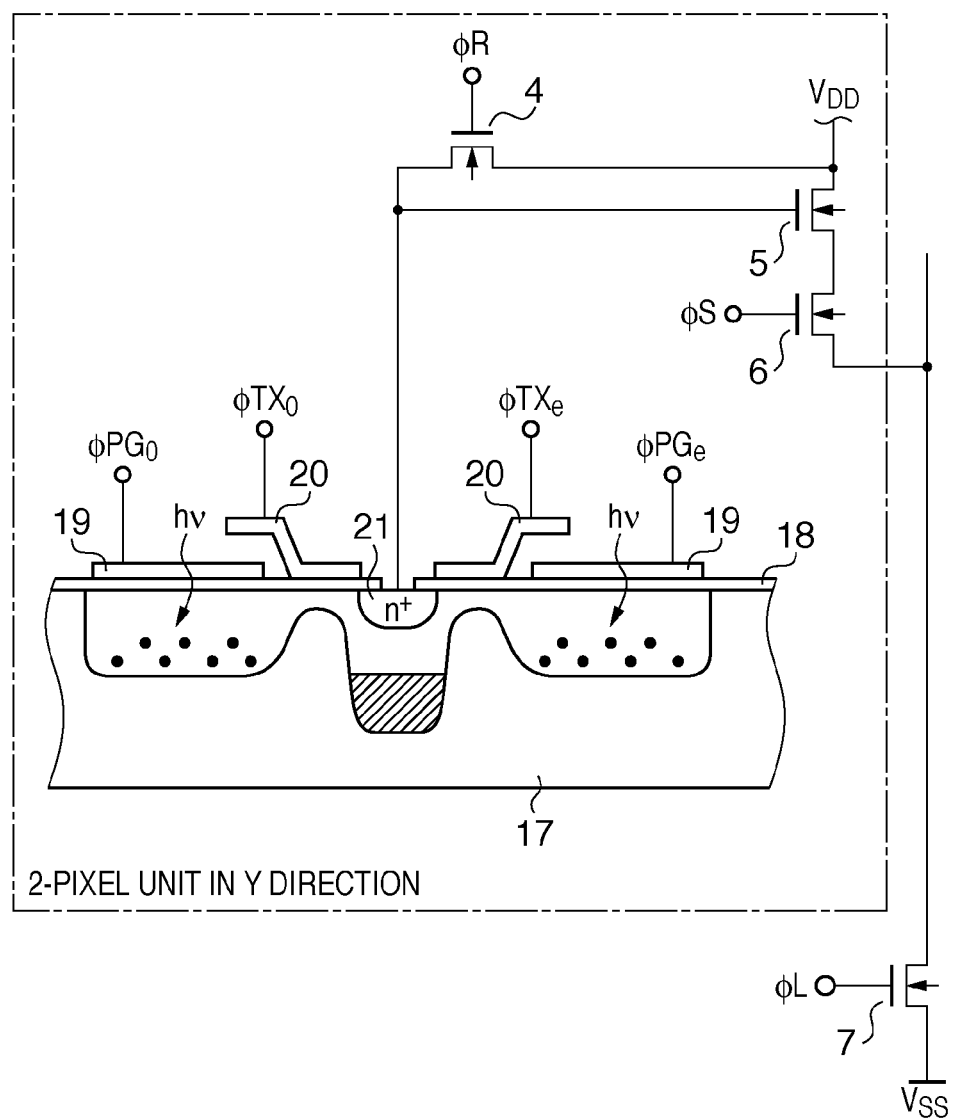

FIG. 5A
FIG. 5B
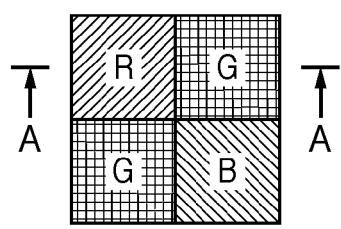
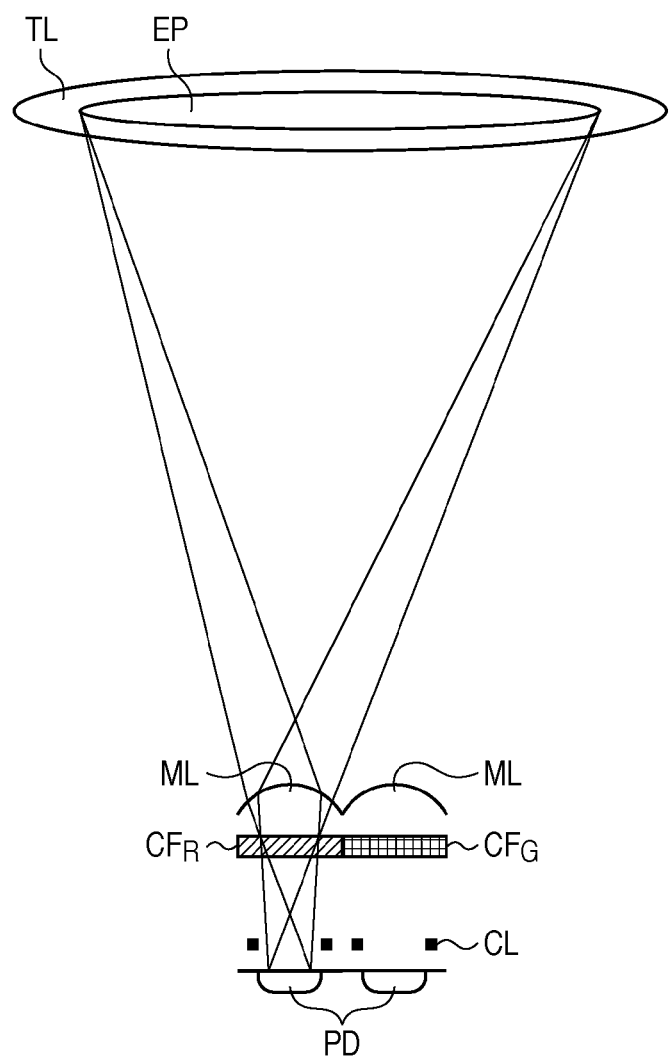

FOCUS DETECTION APPARATUS WITH WEIGHTING OF PIXEL OUTPUTS

TECHNICAL FIELD

The present invention relates to a focus detection apparatus incorporated in a digital still camera, a video camera or the like.

BACKGROUND ART

Conventionally, for a camera's autofocus detection apparatus, an autofocusing apparatus which operates in the following manner is well-known. Light beams from an object that have passed through different exit pupil areas of a photographing lens are led to form an image on a pair of line sensors, and a relative positional displacement amount of a pair of image signals obtained from the line sensors is acquired, thereby detecting a defocus amount of the object and driving the focus lens in accordance with the defocus amount (e.g., refer to Japanese Patent Laid-Open No. 2000-292686).

Furthermore, there has been a proposed technique for realizing phase-difference focus detection by providing a phase-difference detection function to an image sensor and not requiring a dedicated AF sensor.

For instance, according to Japanese Patent Laid-Open No. 2000-156823, a pupil division function is provided to part of light receiving elements (pixels) of an image sensor by eccentrically having the sensitivity region of the light receiving area with respect to the optical axis of an on-chip microlens. By arranging these pixels serving as focus detection pixels at predetermined intervals between image sensing pixels, phase-difference focus detection is realized.

Meanwhile, in a charge-storage-type sensor, the charge storage amount itself reduces in a low-brightness object. Therefore, the S/N ratio of the sensor output declines, causing a problem of deteriorated focus detection precision.

In general, focus detection pixels disclosed in Japanese Patent Laid-Open No. 2000-156823 have a smaller opening portion than that of dedicated AF sensor pixels. Therefore, the S/N ratio for a low-brightness object declines. This is because of the following reason. Since the place where the focus detection pixels are arranged becomes a defective portion of the image sensing pixels, it is necessary that the size of the focus detection pixels be the same as or smaller than the size of the image sensing pixels. Therefore, the size of the focus detection pixels cannot be designed freely as in the dedicated AF sensor pixels.

In view of the above, Japanese Patent Laid-Open No. 10-319311 discloses a focus detection apparatus comprising pixel pitch switching means which can combine or separate the neighboring photoelectric conversion pixel arrays. This focus detection apparatus uses the pixel pitch switching means, when sensing a low-brightness object, to combine the neighboring photoelectric conversion pixel arrays, thereby increasing the charge storage amount and improving the S/N ratio.

Meanwhile, in phase-difference focus detection, it is known that an object's high-frequency component exerts a negative effect on detection precision.

In view of the above, Japanese Patent Laid-Open No. 6-308379 discloses a configuration for optically cutting a high-frequency component by slightly inclining the line sensor pixels with respect to the horizontal and vertical directions of the photographing screen.

However, according to the focus detection apparatus disclosed in Japanese Patent Laid-Open No. 10-319311, if image signals are formed by adding neighboring pixel signals in order to improve the S/N ratio, the pixel pitch becomes coarse and the resolving power of the spatial frequency that can be detected will reduce. For this reason, an error of the focus detection result obtained from high-frequency components of an object will become large.

Furthermore, the focus detection apparatus disclosed in Japanese Patent Laid-Open No. 6-308379 has a problem in that a high-frequency component cannot optically be cut if an object is in parallel with the inclined pixels and has a high frequency.

DISCLOSURE OF INVENTION

The present invention has been proposed in view of the above-described problems. The invention is provided to reduce focus detection errors generated by a high-frequency component of an object even if a pixel pitch becomes coarse by combining or adding neighboring pixels.

According to the present invention, there is provided a focus detection apparatus comprising: an image sensor configured to convert an object image, the image sensor having a focus detection pixel for receiving a light beam that has passed through a partial area, which is a division of an exit pupil of an optical system for forming an object image; addition means configured to multiply outputs of a plurality of the focus detection pixels included in a predetermined area of the image sensor by a weighting coefficient corresponding to a position of the focus detection pixel, and perform addition; and defocus amount calculation means configured to calculate a defocus amount based on a pair of phase-difference detection signals generated based on an output of the addition means.

Further features of the present invention will become apparent from the following description of exemplary embodiments with reference to the attached drawings.

BRIEF DESCRIPTION OF DRAWINGS

FIG. 3 is a cross-section of a pixel portion of the image sensor;

FIG. 5A is a plan view showing image sensing pixels of the image sensor;

FIG. 5B is a cross-section showing image sensing pixels of the image sensor;

FIG. 9 is an explanatory view of pixel arrays in the higher unit of the image sensor;

FIG. 11 is an explanatory view of a pixel grouping method in lateral-deviation focus detection;

FIG. 13 is an explanatory view of a pixel grouping method in longitudinal-deviation focus detection;

BEST MODE FOR CARRYING OUT THE INVENTION

An embodiment of the present invention will now be described in detail with reference to the accompanying drawings.

Figure 1:
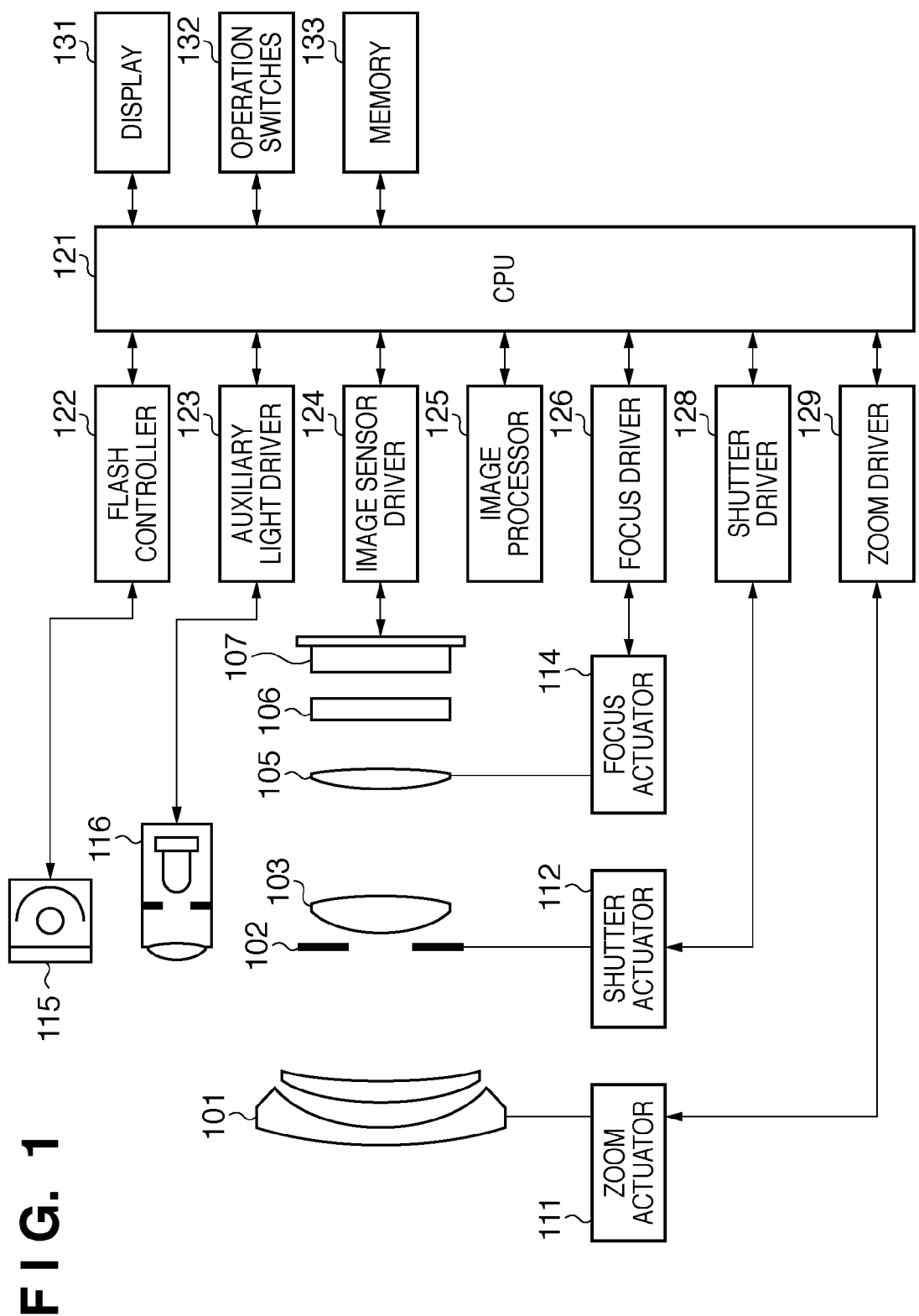
FIG. 1 is a diagram showing a configuration of a digital camera according to an embodiment of the present invention.

FIG. 1 is a diagram showing a configuration of a camera according to an embodiment of the present invention. It shows a digital camera in which a photographing optical system and a camera main body having an image sensor are integrated.

In FIG. 1, numeral 101 denotes first lenses arranged at the edge of the photographing optical system (photograph lens), which can be moved forward or backward in the optical-axis direction. Numeral 102 denotes a shutter also serving as a diaphragm, which serves to adjust the light amount at the time of photography by adjusting the aperture, and also serves to adjust exposure time at the time of still image photography. Numeral 103 denotes second lenses. The shutter 102 and the second lenses 103 integratedly move forward or backward in the optical-axis direction, and change magnification (zooming) in conjunction with forward or backward motion of the first lenses 101.

Numeral 105 denotes third lenses which perform focusing by forward or backward motion in the optical-axis direction. Numeral 106 denotes an optical low-pass filter which serves to reduce pseudo colors or moiré of photographing images. Numeral 107 denotes an image sensor configured with a C-MOS sensor and its peripheral circuitry. The image sensor 107 is a two-dimensional single panel color sensor, in which Bayer patterned primary color mosaic filters are formed on-chip on the light-receiving pixels having m pixels in the horizontal direction and n pixels in the vertical direction.

Numeral 111 denotes a zoom actuator, which moves the first lenses 101 and the second lenses 103 forward or backward in the optical-axis direction to change magnification by rotation of a barrel cam. Numeral 112 denotes a shutter actuator, which adjusts the photograph light amount by controlling the aperture of the shutter 102, and controls exposure time at the time of still image photography. Numeral 114 denotes a focus actuator which performs focusing by moving the third lenses 105 forward or backward in the optical-axis direction.

Numeral 115 denotes an electronic flash for illuminating an object at the time of photography. A flash lighting apparatus using a xenon tube is usually employed, but a lighting apparatus using a serially emitting LED may also be employed. Numeral 116 denotes an AF auxiliary light projector, which projects a mask image, having a predetermined opening pattern, on a shooting field through a projection lens so as to improve focus detection performance for a dark object or an object having a low contrast.

Numeral 121 denotes a CPU for managing various control of the camera main body. The CPU 121 comprises a calculator, ROM, RAM, an A/D converter, a D/A converter, a communication interface circuit and the like, and drives various circuits included in the camera based on a predetermined program stored in the ROM. Also, the CPU executes a series of operations such as auto-focusing (AF), auto-exposure (AE), photographing, image processing, recording, and the like.

Numeral 122 denotes a flash controller which controls flashing of the electronic flash 115 in synchronization with a photographic operation. Numeral 123 denotes an auxiliary light driver which controls lighting of the AF auxiliary light projector 116 in synchronization with a focus detection operation. Numeral 124 denotes an image sensor driver which drives the image sensor 107, and transmits acquired image signals to the CPU 121 after A/D conversion is performed. Numeral 125 denotes an image processor which performs γ conversion, color interpolation, JPEG compression and the like on the image signals acquired by the image sensor 107.

Numeral 126 denotes a focus driver which drives the focus actuator 114 based on a focus detection result so as to move the third lenses 105 forward or backward in the optical-axis direction for focusing. Numeral 128 denotes a shutter driver which drives the shutter actuator 112 for controlling the aperture of the shutter 102. Numeral 129 denotes a zoom driver which drives the zoom actuator 111 in accordance with a photographer's zoom operation.

Numeral 131 denotes a display configured with an LCD or the like for displaying information regarding the camera's photograph mode, a preview image before a photograph is taken, a confirmation image after a photograph is taken, a focus state display image at the time of focus detection, and the like. Numeral 132 denotes operation switches including a power switch, a shutter release (photograph trigger) button, a zoom operation switch, a photograph-mode selection switch, and the like. Numeral 133 denotes a removable memory, e.g., flash memory, for recording photographed images.

Figure 2:
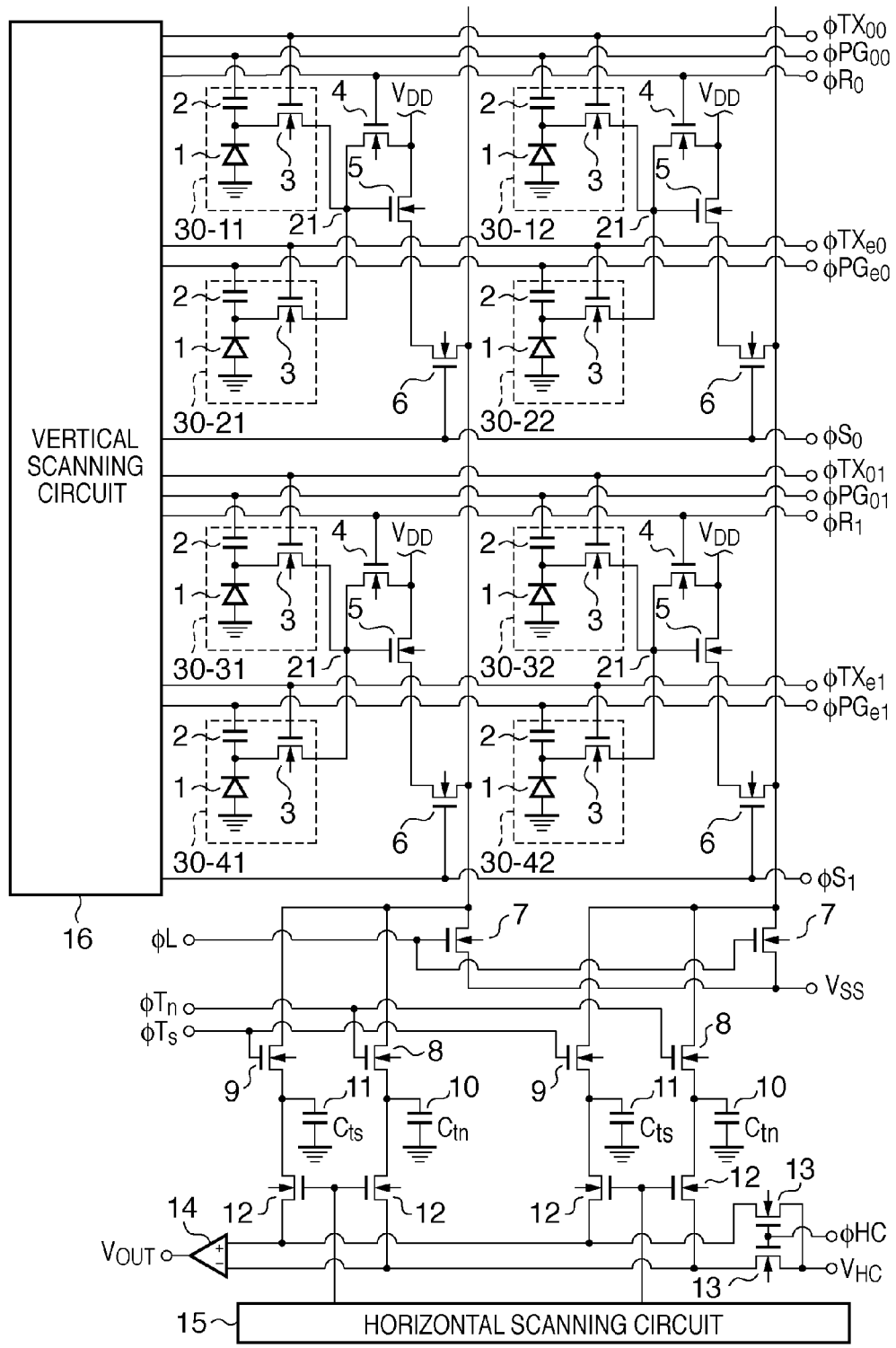
FIG. 2 is a circuitry diagram of an image sensor.

FIG. 2 is a schematic circuitry diagram of the image sensor 107, which is manufactured using the technique disclosed in Japanese Patent Laid-Open No. 09-046596.

FIG. 2 shows an area having 2 columns×4 rows of pixels of a two-dimensional C-MOS area sensor. In a case where this is used as an image sensor, a large number of pixels shown in FIG. 2 are arranged so as to enable high-resolution image acquisition. In this embodiment, a description of the image sensor is provided assuming that the pixel pitch is 2 μm, the number of effective pixels are 3000 (horizontal)×2000 (vertical)=6 million pixels, and the image-sensing screen size is 6 mm (horizontal)×4 mm (vertical).

Referring to FIG. 2, numeral 1 denotes a photoelectric converter comprising a MOS transistor gate and a depletion layer under the gate; 2, a photo gate; 3, a transfer-switch MOS transistor; 4, a reset MOS transistor; 5, a source follower amplifier MOS transistor; 6, a horizontal selection switch MOS transistor; 7, a source follower's load MOS transistor; 8, a dark output transfer MOS transistor; 9, a bright output transfer MOS transistor; 10, a dark output storage capacity Ctn; 11, a bright output storage capacity Cts; 12, a horizontal transfer MOS transistor; 13, a horizontal output line reset MOS transistor; 14, a differential output amplifier; 15, a horizontal scanning circuit; and 16, a vertical scanning circuit.

FIG. 3 is a cross-section of each pixel portion.

In FIG. 3, numeral 17 denotes a P-type well; 18, a gate oxidized film; 19, a first-layer poly-Si; 20, a second-layer poly-Si; and 21, a n+ floating diffusion (FD) unit. The FD unit 21 is connected to another photoelectric converter through another transfer MOS transistor. In FIG. 3, the drain of the two transfer MOS transistors 3 is provided in common to the FD unit 21 in order to realize miniaturization and improved sensitivity by the capacity reduction of the FD unit 21. However, the FD unit 21 may be connected with Al wiring.

Figure 4:
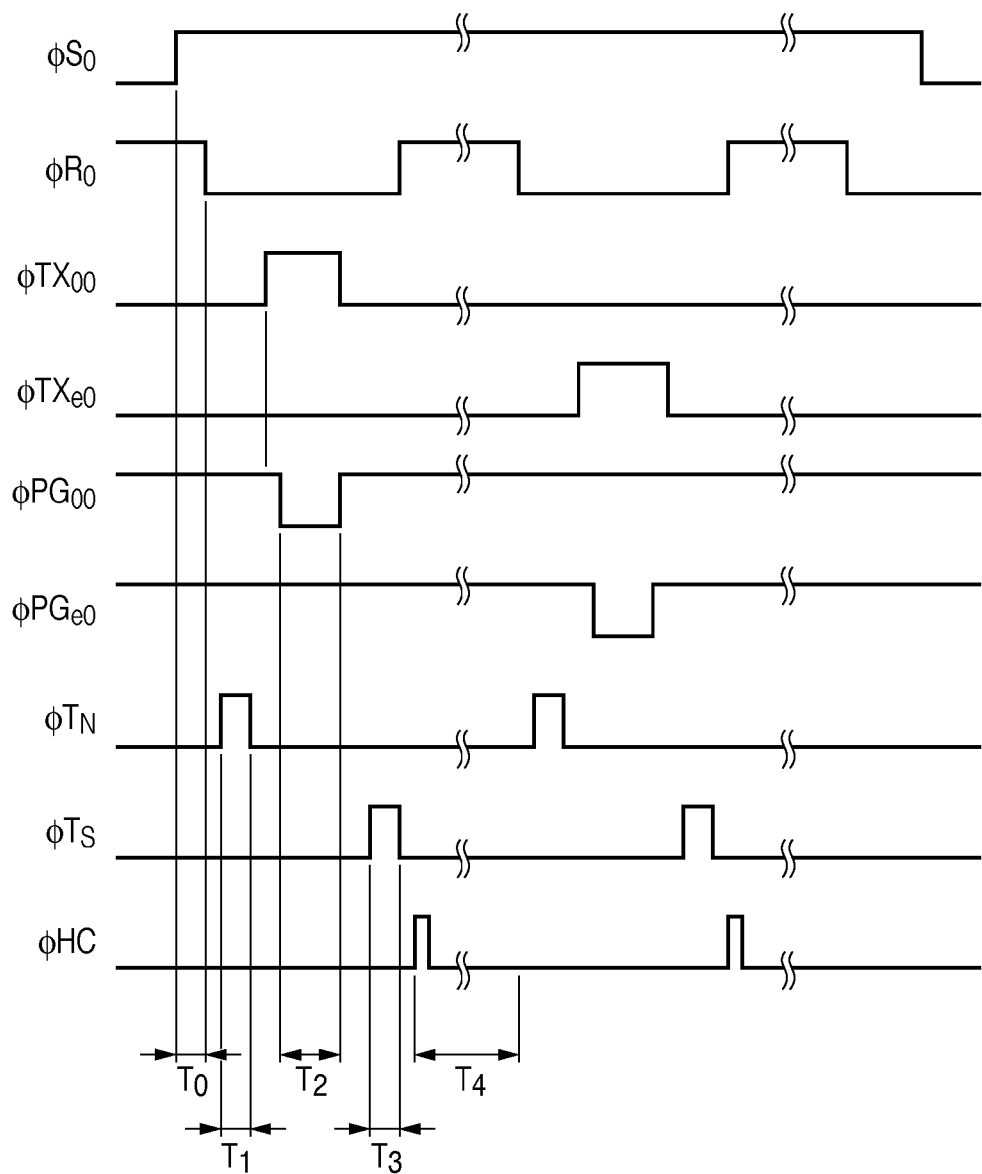
FIG. 4 is a timing chart for driving the image sensor.

Next, an operation of the image sensor is described using the timing chart in FIG. 4. The timing chart shows the timing for outputting all pixels independently.

When the vertical scanning circuit 16 outputs a timing signal, a control pulse φL is set high and the vertical output line is reset. Furthermore, the control pulses φR0, φPG00, φPGe00 are set high, the reset MOS transistor 4 is turned on, and the first-layer poly-Si 19 of the photo gate 2 is set high. At time T0, the control pulse φs0 is set high, the selection switch MOS transistor 6 is turned on, and the first-line and second-line pixel portions are selected. Next, the control pulse φR0 is set low to stop resetting the FD unit 21, and the FD unit 21 is made in a floating state. Then, after the gate and the source of the source follower amplifier MOS transistor 5 are made to pass by, the control pulse φTn is set high at time T1, and a dark voltage of the FD unit 21 is outputted to the storage capacity Ctn 10 by a source follower operation.

Next, in order to perform photoelectric conversion output of the first-line pixels, the first-line control pulse φTX00 is set high for turning on the transfer switch MOS transistor 3, and then the control pulse φPG00 is set low at time T2. At this time, it is preferable that the potential well extended below the photo gate 2 be raised to achieve a voltage relation for completely transferring the photo-generation carrier to the FD unit 21. Therefore, as long as complete transfer can be achieved, the control pulse φTX may be of a fixed potential instead of a pulse.

When the charge from the photoelectric converter 1 of the photodiode is transferred to the FD unit 21 at time T2, the potential of the FD unit 21 changes in accordance with the light. In this stage, since the source follower amplifier MOS transistor 5 is in the floating state, the control pulse φTs is set high at time T3 to output the potential of the FD unit 21 to the storage capacity Cts 11. At this point, the dark and light outputs of the first-line pixels are stored respectively in the storage capacities Ctn 10 and Cts 11. The control pulse φHC is temporarily set high at time T4 to turn on the horizontal output line reset MOS transistor 13 so as to reset the horizontal output line, and the pixel's dark and light outputs are outputted to the horizontal output line by the scanning timing signal of the horizontal scanning circuit 15 during the horizontal transfer period. By acquiring a differential output Vout using the differential amplifier 14 of the storage capacities Ctn 10 and Cts 11, signals having a good S/N ratio, from which pixel's random noise and fixed-pattern noise are removed, can be obtained. The photoelectric charges of the pixels 30-12 and 30-22 are stored simultaneously as that of the pixels 30-11 and 30-21 respectively in the storage capacities Ctn 10 and Cts 11. To read them, the timing pulse from the horizontal scanning circuit 15 is delayed by one pixel so that the photoelectric charges are read out to the horizontal output line and outputted from the differential amplifier 14.

Although the present embodiment provides a configuration in which the differential output Vout is generated inside the chip, a similar effect can be attained even if a conventional correlated double sampling (CDS) circuit is used outside the chip.

After the bright output is outputted to the storage capacity Cts 11, the control pulse φR0 is set high to turn on the reset MOS transistor 4, thereby resetting the FD unit 21 to the power source voltage VDD. After the horizontal transfer of the first line is completed, reading of the second line is performed. In the second-line reading, the control pulses φTxe0 and φPge0 are similarly driven, high pulses are supplied respectively to the control pulses φTn and φTs, photoelectric charges are respectively stored in the storage capacities Ctn 10 and Cts 11, and dark and bright outputs are extracted. By the above-described driving operation, the first-line reading and second-line reading can independently be performed. Thereafter, the vertical scanning circuit is driven to read the 2n+1, 2n+2 (n=1, 2, . . . ) lines. As a result, all pixels can independently be outputted. More specifically, when n=1 stands, first, the control pulse φS1 is set high. Next, the control pulse φR1 is set low. Then, the control pulses φTn and φTX01 are set high. The control pulse φPG01 is set low. The control pulse φTs is set high. The control pulse φHC is temporarily set high, and signals of the pixels 30-31 and 30-32 are read. Next, control pulses φTxe1 and φPge1 are driven and control pulses are supplied similarly in the aforementioned manner, thereby reading the signals of the pixels 30-41 and 30-42.

FIGS. 5A to 7B are explanatory views showing configurations of the image sensing pixels and focus detection pixels. This embodiment employs a Bayer pattern in which pixels having green (G) spectral sensitivity are arranged in the diagonal two pixels, and a pixel having red (R) spectral sensitivity and a pixel having blue (B) spectral sensitivity are arranged in the other two pixels. Between the Bayer patterns, focus detection pixels having the configuration which will be described later are distributed according to a predetermined rule.

FIGS. 5A and 5B show the arrangement and configuration of the image sensing pixels.

FIG. 5A is a plan view showing image sensing pixels having 2 rows×2 columns. In a Bayer pattern, as is well-known, G pixels are arranged diagonally and R and B pixels are arranged respectively in the other two pixels. The pattern of 2 rows×2 columns is repeatedly arranged.

FIG. 5B shows the cross-section cut along the line A-A in FIG. 5A. ML denotes an on-chip microlens arranged on the front surface of each pixel; CFR denotes a red (R) color filter; and CFG denotes a green (G) color filter. PD (Photodiode) schematically shows the C-MOS sensor's photoelectric converter described in FIG. 3. CL (Contact Layer) denotes a wiring layer for forming signal lines which transmit various signals of the C-MOS sensor.

The on-chip microlens ML of the image sensing pixel and the photoelectric converter PD are configured in a way that light beams that have passed through the photographing optical system TL (Taking Lens) are captured as effectively as possible. In other words, the exit pupil EX of the photographing optical system TL and the photoelectric converter PD have a conjugate relation with the microlens ML, and the effective area of the photoelectric converter is designed to have a large area. Although FIG. 5B describes an incoming light beam of the R pixel, the G pixel and B (Blue) pixel also have the same configuration. Since the exit pupil EP corresponding to each of the R, G, and B image sensing pixels has a large diameter, light beams (photon) from an object are effectively captured, and the image-signal S/N ratio is improved.

Figure 6A:
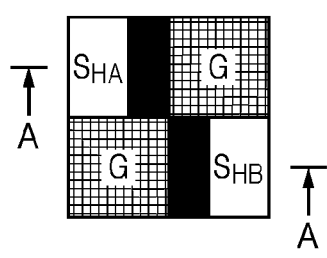
FIG. 6A is a plan view showing AF pixels of the image sensor.
Figure 6B:
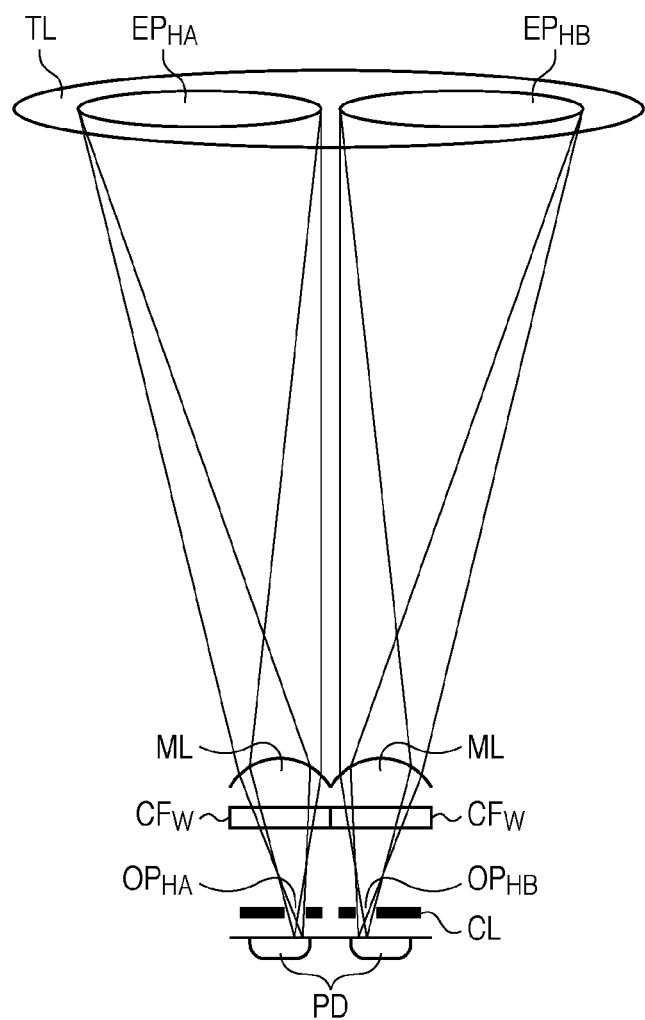
FIG. 6B is a cross-section showing AF pixels of the image sensor.

FIGS. 6A and 6B are views showing the arrangement and configuration of the focus detection pixels for performing pupil division in the horizontal direction (lateral direction) of the photographing optical system. Herein, the horizontal or lateral direction indicates a direction parallel to a straight line which is orthogonal to and which extends horizontally to the optical axis of the photographing optical system when the camera is set up in a way that the optical axis of the photographing optical system is horizontal. FIG. 6A is a plan view showing pixels of 2 rows×2 columns including focus detection pixels. To acquire image signals for recording or viewing, the primary components of the brightness information are acquired by G pixels. Since human image recognition characteristics are sensitive to brightness information, if a G pixel is defective, image quality deterioration is easily perceivable. On the other hand, R or B pixels acquire color information (chrominance information). Since human visual-sense characteristics are insensitive to color information, even if a pixel acquiring color information is somewhat defective, image quality deterioration is not easily perceived. In view of this, according to the present embodiment, among the pixels of 2 rows×2 columns, G pixels are kept for image sensing pixels, while R and B pixels are replaced with focus detection pixels. The focus detection pixels are indicated by SHA and SHB in FIG. 6A.

FIG. 6B shows the cross-section cut along the line A-A in FIG. 6A. The microlens ML and the photoelectric converter PD have the same configuration as that of the image sensing pixels shown in FIG. 5B. In this embodiment, since signals of the focus detection pixels are not used for image creation, a clear film CFW (White) is arranged instead of the color filter provided for color separation. To perform pupil division in the image sensor, the opening portion of the wiring layer CL is deflected to one direction from the center line of the microlens ML. More specifically, the opening portion OPHA of the pixel SHA is deflected to the right side so as to receive a light beam that has passed through the left exit pupil EPHA (partial area of the exit pupil) of the photographing optical system TL. Similarly, the opening portion OPHB of the pixel SHB is deflected to the left side so as to receive a light beam that has passed through the right exit pupil EPHB of the photographing optical system TL. The pixels SHA are regularly arranged in the horizontal direction, and an object image acquired by these pixels is defined as an image A (phase-difference detection signal). The pixels SHB are also regularly arranged in the horizontal direction, and an object image acquired by these pixels is defined as an image B. Detecting the relative position between the images A and B can detect an out-of-focus amount (defocus amount) of the object image.

Note in the above-described pixels SHA and SHB, focus detection can be performed on an object having brightness distribution in the horizontal direction of the photograph screen, e.g., longitudinal lines; however, focus detection cannot be performed on lateral lines having brightness distribution in the vertical direction. In view of this, in order to be able to perform focus detection on the latter case, the present embodiment comprises pixels for performing pupil division in the vertical direction (longitudinal direction) of the photographing optical system.

Figure 7A:
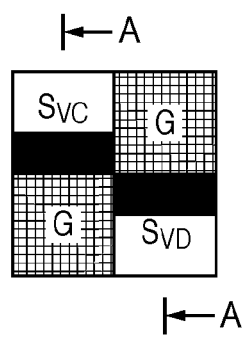
FIG. 7A is a plan view showing other AF pixels of the image sensor.
Figure 7B:
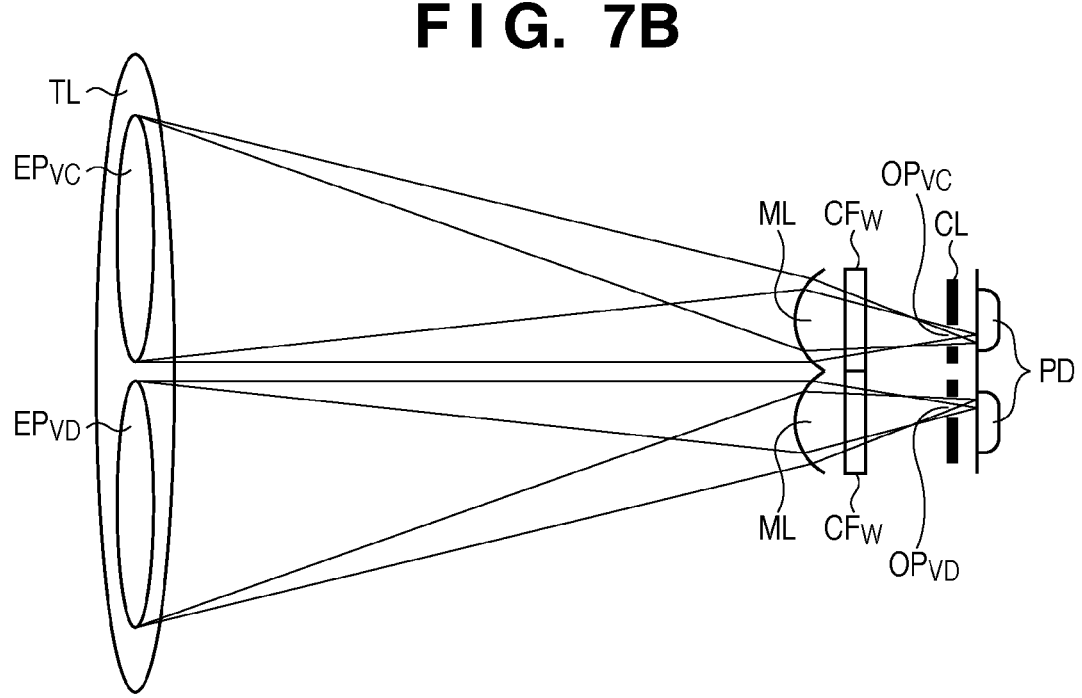
FIG. 7B is a cross-section showing other AF pixels of the image sensor.

FIGS. 7A and 7B show the arrangement and configuration of the focus detection pixels for performing pupil division in the vertical direction (in other words, top-to-bottom direction or longitudinal direction) of the photographing optical system. Herein, the vertical, top-to-bottom, or longitudinal direction indicates a direction parallel to a straight line which is orthogonal to and which extends vertically to the optical axis of the photographing optical system when the camera is set up in a way that the optical axis of the photographing optical system is horizontal. FIG. 7A is a plan view showing pixels of 2 rows×2 columns including focus detection pixels. Similar to FIG. 6A, G pixels are kept for image sensing pixels, while R and B pixels are used for focus detection pixels. The focus detection pixels are indicated by SVC and SVD in FIG. 7A.

FIG. 7B shows the cross-section cut along the line A-A in FIG. 7A. While the pixels in FIG. 6B have a configuration which divides the pupil in the horizontal direction, the pixels in FIG. 7B have a configuration which divides the pupil in the vertical direction. Other configurations of the pixels are the same. More specifically, the opening portion OPVC of the pixel SVC is deflected to the lower side so as to receive a light beam that has passed through the upper exit pupil EPVC of the photographing optical system TL. Similarly, the opening portion OPVD of the pixel SVD is deflected to the upper side so as to receive a light beam that has passed through the lower exit pupil EPVD of the photographing optical system TL. The pixels SVC are regularly arranged in the vertical direction, and an object image acquired by these pixels is defined as an image C. The pixels SVD are also regularly arranged in the vertical direction, and an object image acquired by these pixels is defined as an image D. Detecting the relative position between the images C and D can detect an out-of-focus amount (defocus amount) of the object image having brightness distribution in the vertical direction.

Figure 8:
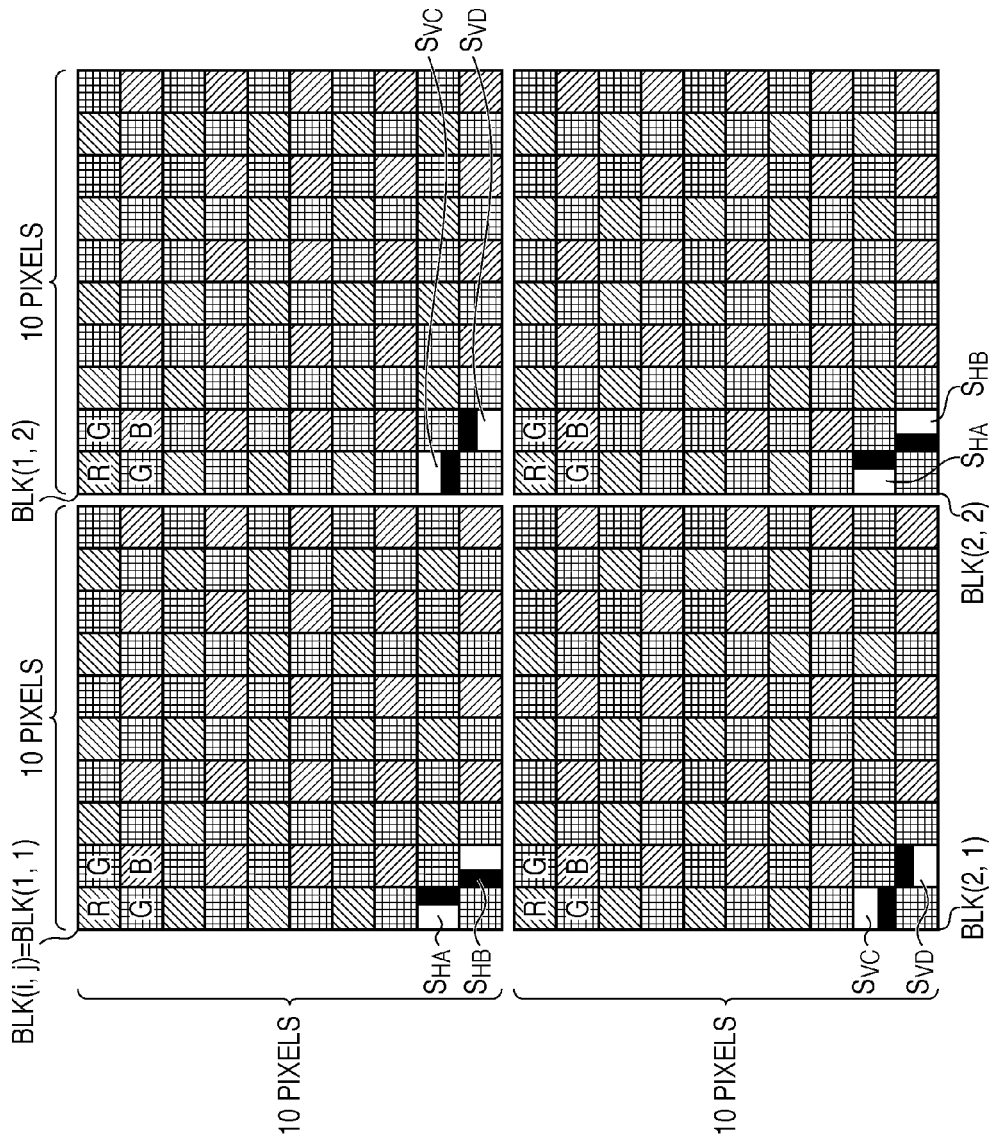
FIG. 8 is an explanatory view of pixel arrays in the minimum unit of the image sensor.
Figure 9:
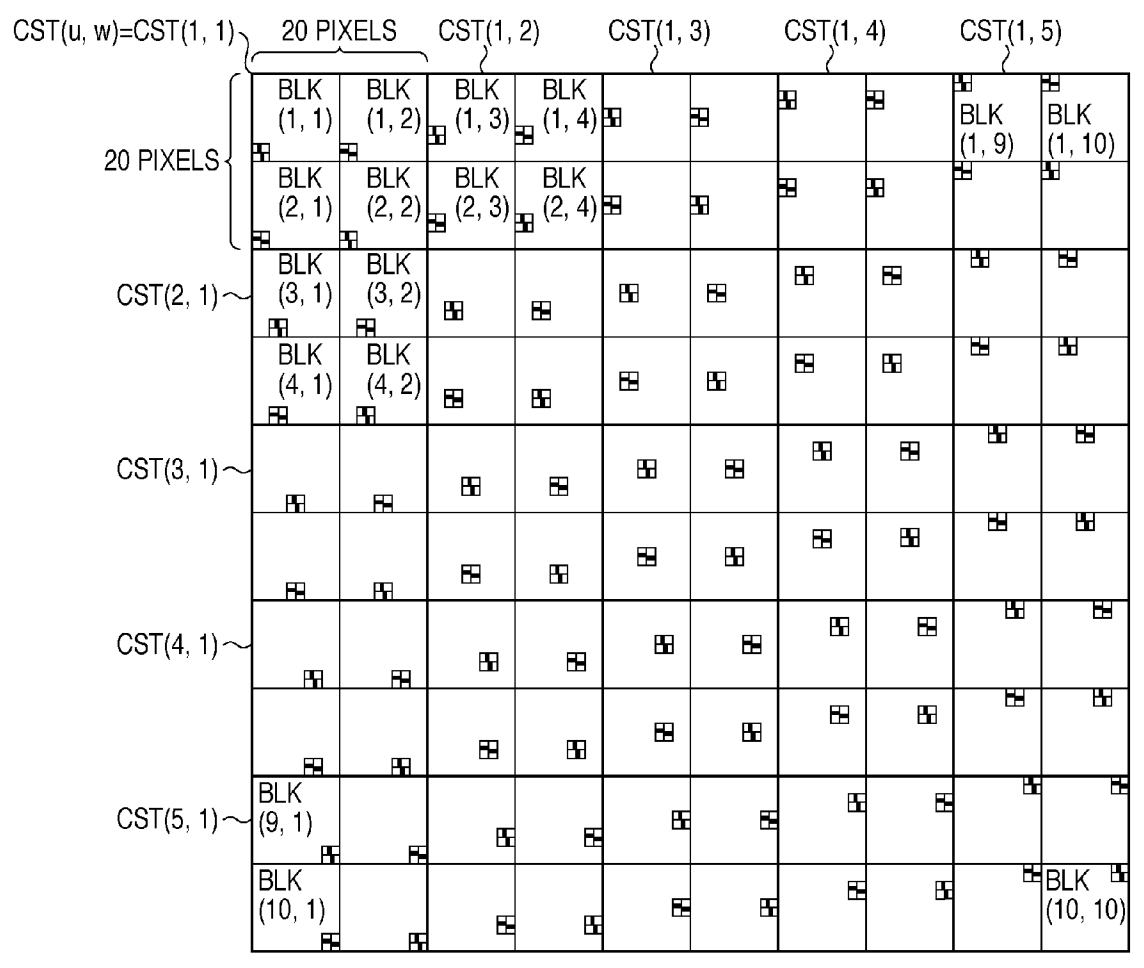
Figure 10:
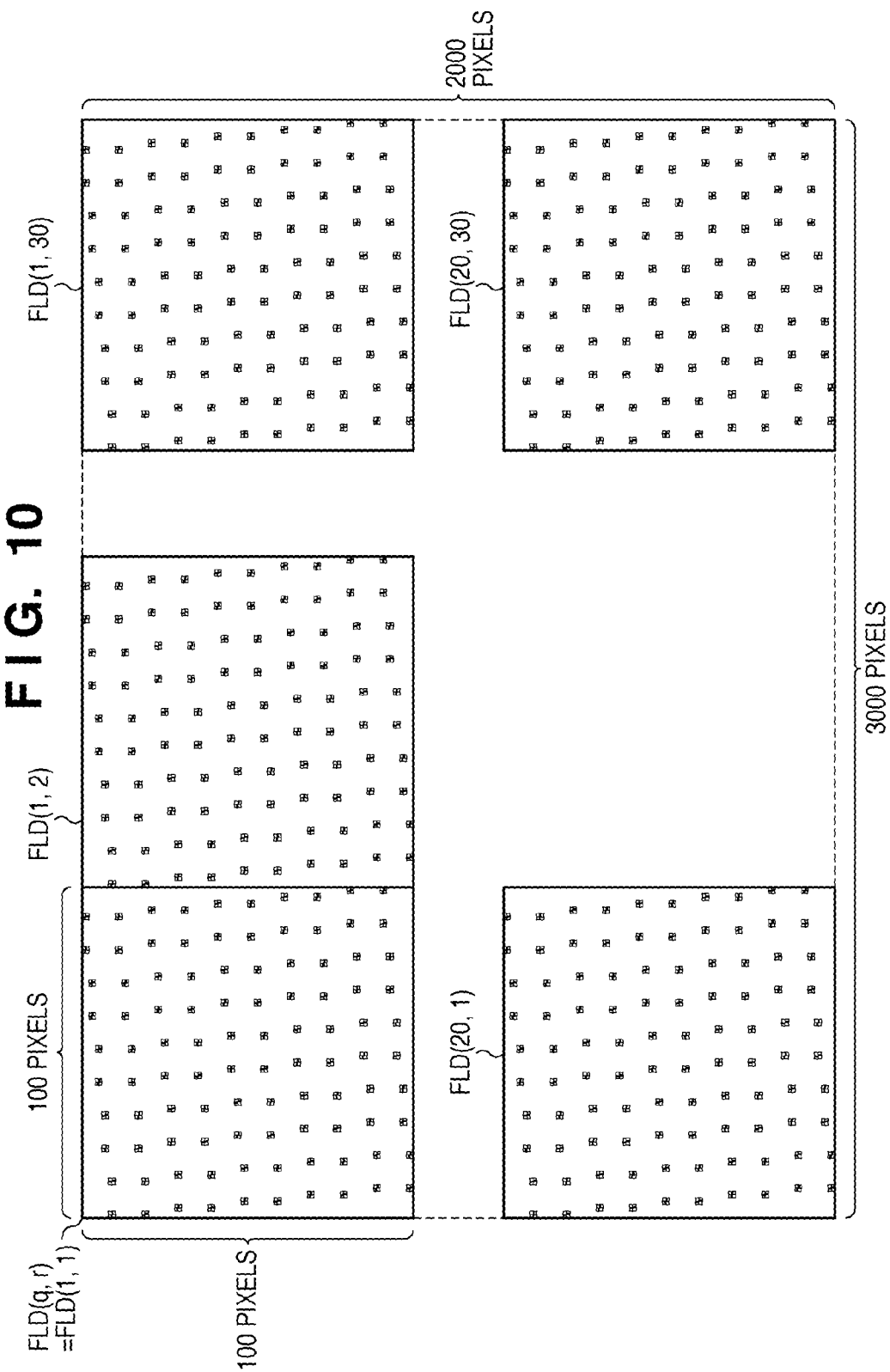
FIG. 10 is an explanatory view of pixel arrays in the entire area of the image sensor.

FIGS. 8 to 10 are explanatory views of the pixel arrangement rule of the image sensing pixels and focus detection pixels described in the above-described FIGS. 5A to 7B.

FIG. 8 is an explanatory view of the minimum-unit arrangement rule for discretely arranging the focus detection pixels between the image sensing pixels.

In FIG. 8, 10 rows×10 columns=100 pixels are defined to be one block. In the top left block BLK (1, 1), the bottom left pixels R and B are replaced with a pair of focus detection pixels SHA and SHB which perform pupil division in the horizontal direction.

In the neighboring block BLK (1, 2) on the right, similarly the bottom left pixels R and B are replaced with a pair of focus detection pixels SVC and SVD which perform pupil division in the vertical direction. The neighboring block BLK (2, 1) below the initial block BLK (1, 1) has the same pixel arrays as that of the block BLK (1, 2). The neighboring block BLK (2, 2) on the right has the same pixel arrays as that of the initial block BLK (1, 1).

The arrangement rule is expressed universally hereinafter. In a block BLK (i, j), if i+j is an even number, the focus detection pixels for horizontal pupil division are arranged, while if i+j is an odd number, the focus detection pixels for vertical pupil division are arranged. The 4 blocks (2×2=4) in FIG. 8, namely, the area of 400 pixels (20 rows×20 columns=400) is defined to be a cluster as a higher-level block array unit.

FIG. 9 is an explanatory view of the arrangement rule using the aforementioned cluster as a unit.

In FIG. 9, the top left cluster having 400 pixels (20 rows×20 columns=400) is defined to be CST (u, w)=CST (1, 1). In the cluster CST (1, 1), the bottom left pixels R and B of each block are replaced with the focus detection pixels SHA and SHB or SVC and SVD.

In the neighboring cluster CST (1, 2) on the right, the focus detection pixel arrangement in the block is applied to a position shifted by two pixels to the upper direction from the cluster CST (1, 1). In the neighboring cluster CST (2, 1) below the initial cluster CST (1, 1), the focus detection pixel arrangement in the block is applied to a position shifted by two pixels to the right direction from the cluster CST (1, 1). By repeatedly applying the above-described rule, the arrangement shown in FIG. 9 is obtained.

The arrangement rule is universally expressed in the following manner. Assuming that the four pixels including G pixels shown in FIGS. 6A and 6B or FIGS. 7A and 7B are one unit (pair), coordinates of the focus detection pixels are defined by the coordinates of the top left pixel of the unit. For the coordinates of each block, the top left coordinates are defined as (1, 1), and the right and lower directions are the positive direction.

The above-described definition is now applied. In a cluster CST (u, w), a horizontal coordinate value of a pair of focus detection pixels in each block is 2×u−1, and a vertical coordinate value is 11−2×w. The 25 clusters (5×5=25) in FIG. 9, namely, the area of 10,000 pixels (100 rows×100 columns=10,000) is defined to be a field as a higher-level array unit of a cluster.

FIG. 10 is an explanatory view of the arrangement rule using the aforementioned field as a unit. In FIG. 10, the top left field configured with 10,000 pixels (100 rows×100 columns=10,000 pixels) is defined as FLD (q, r)=FLD (1, 1). In this embodiment, all fields FLD (q, r) have the same arrays as that of the first field FLD (1, 1). If 30 fields of the FLD (1, 1) are arrayed in the horizontal direction and 20 fields of the FLD (1, 1) are arrayed in the vertical direction, the image sensing area of 6 million pixels (3000 columns×2000 rows =6 million pixels) is configured with 600 fields. In this manner, focus detection pixels can be uniformly distributed throughout the entire surface of the image sensing area.

Next, a pixel grouping and a signal addition method at the time of focus detection are described with reference to FIGS. 11 to 14.

Figure 11:
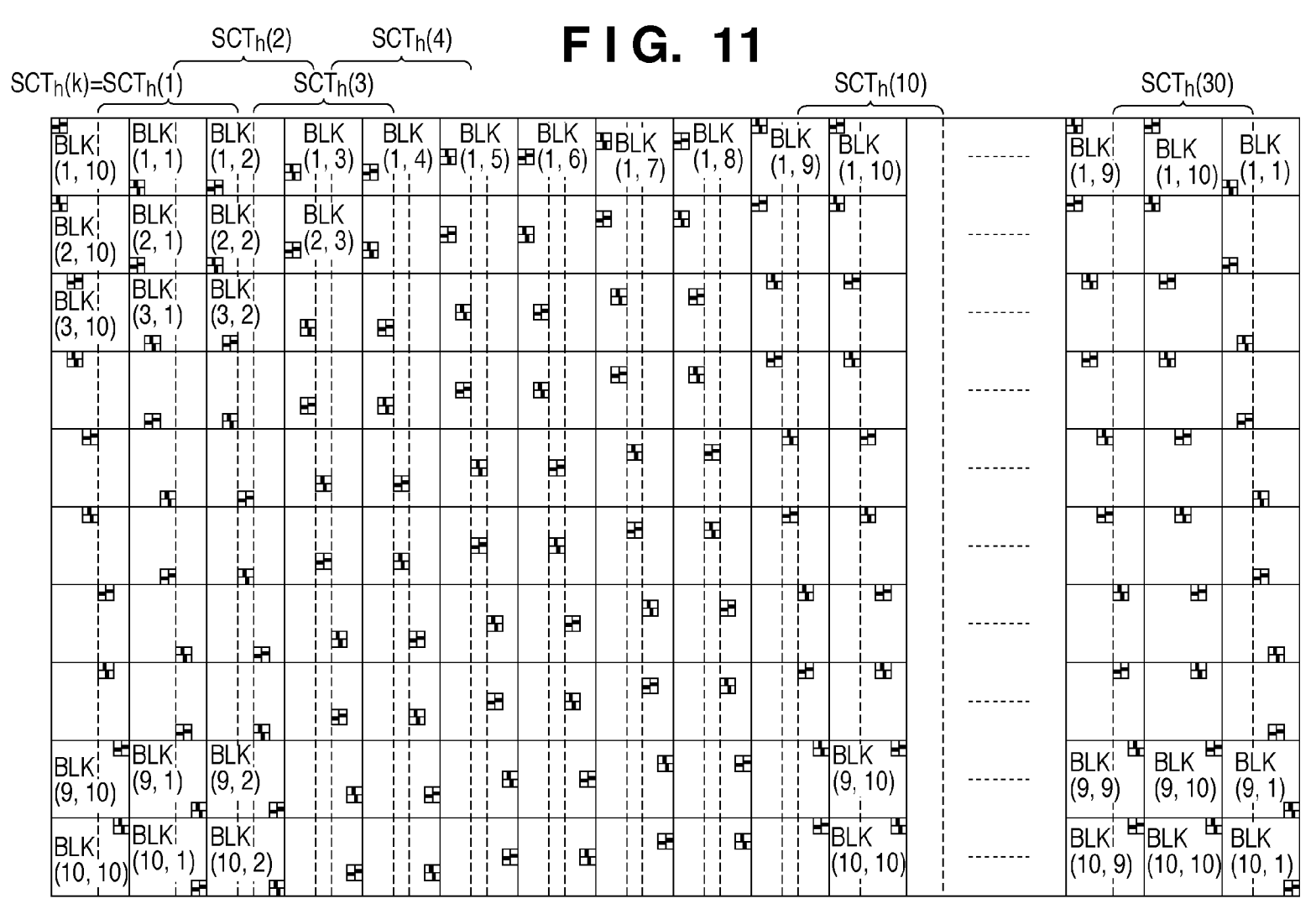

FIG. 11 is an explanatory view of a pixel grouping method in lateral-deviation focus detection (defocus amount calculation) of an object image which is formed by the photographing optical system.

The lateral-deviation focus detection indicates performing phase-difference focus detection using the focus detection pixels described in FIGS. 6A and 6B, which are provided for dividing the exit pupil of the photographing optical system in the lateral direction (left-to-right direction or horizontal direction). That is, for lateral-deviation focus detection, the phase-difference detection direction is the lateral (horizontal) direction.

The pixel arrays shown in FIG. 11 are the one described in FIG. 9. When focus detection is performed, the area surrounded by the dashed lines is used as a group, which is defined as a section. The neighboring sections partially overlap with each other. In this embodiment, horizontally arranged 30 sections constitute one focus detection area. This one focus detection area is defined as an AF area. One section (in the area) includes 9 pixels SHA, provided for a pupil division in the horizontal direction, and 9 pixels SHB provided for the other pupil division. In this embodiment, each output of the 9 pixels SHA is weighted and obtained as 1AF pixel of one image signal (referred to as an image A) for phase difference calculation. Similarly, each output of the 9 pixels SHB is weighted and obtained as 1AF pixel of the other image signal (referred to as an image B) for phase difference calculation.

Figure 12:
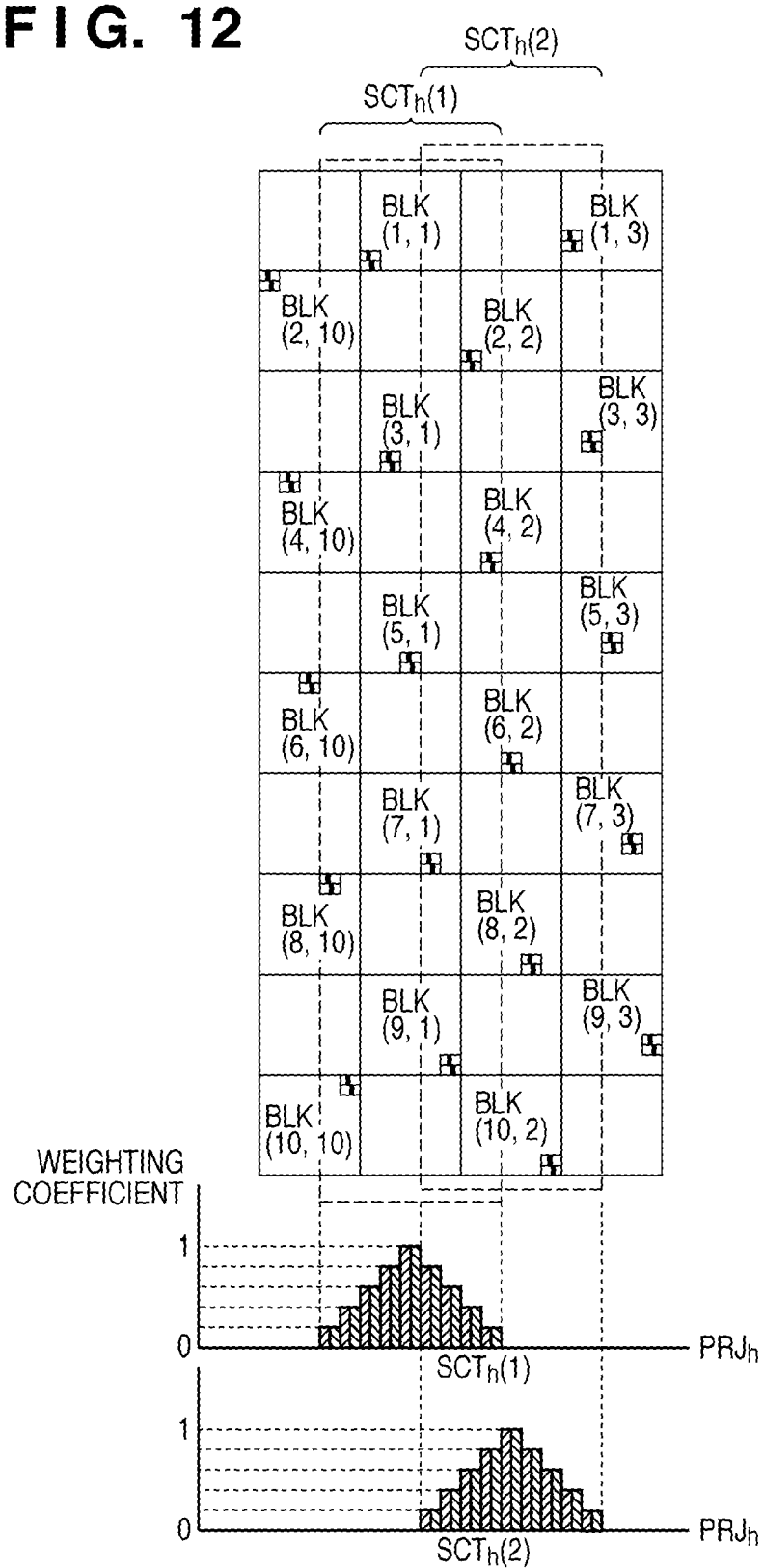
FIG. 12 is an explanatory view of pixel signal weighting coefficient in the lateral-deviation focus detection.

FIG. 12 is an explanatory view of the weight addition method in a section.

FIG. 12 shows two sections cut out from the left end of the sections in FIG. 11. The horizontal line PRJh shown at the bottom indicates a weighting coefficient, which corresponds to a projected image signal and the first projection line extending in the pupil-division direction of the focus detection pixels SHA and SHB.

Herein, the weighting coefficient corresponding to each focus detection pixel in the section is larger near the center of the section, while it is smaller in the peripheries. A signal from the focus detection pixel is multiplied by the weighting coefficient, and the multiplication results in the section are integrated. The calculation result of one section is obtained as 1AF pixel signal. For other sections besides the sections SCTh(1) and SCTh(2), similar weighting coefficients are provided, and similar calculation is performed.

Figure 13:
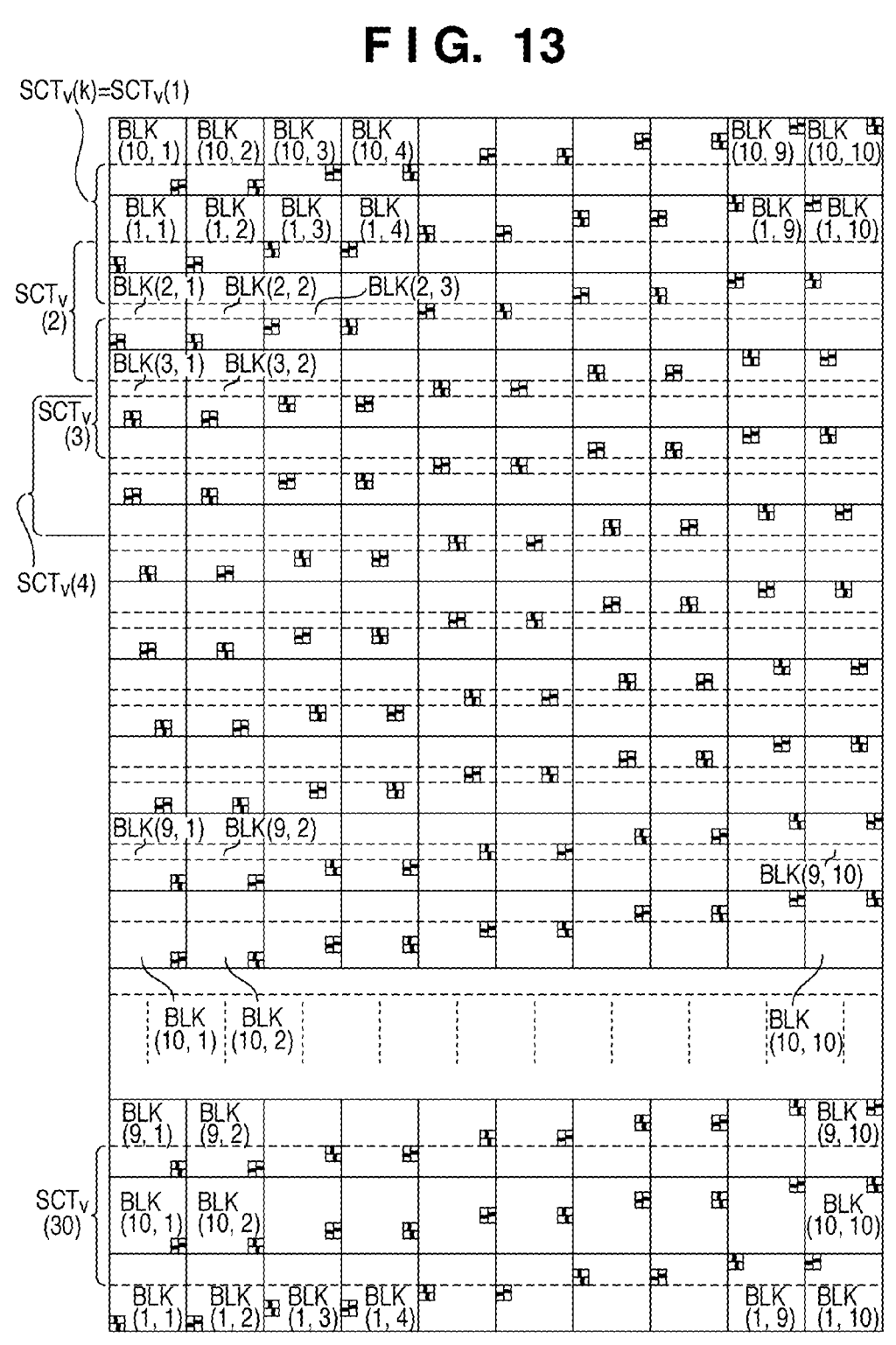

Herein, since neighboring sections have partially overlapping focus detection pixels, it is possible to achieve the same effect as the case where a high-frequency component of an object is optically cut. FIG. 13 is an explanatory view of a pixel grouping method in longitudinal-deviation focus detection of an object image which is formed by the photographing optical system. The longitudinal-deviation focus detection indicates performing phase-difference focus detection using the focus detection pixels described in FIGS. 7A and 7B, which are provided for dividing the exit pupil of the photographing optical system in the longitudinal direction (top-to-bottom direction or vertical direction). That is, for longitudinal-deviation focus detection, the phase-difference detection direction is the longitudinal (vertical) direction. In other words, it corresponds to a 90°-rotated technique of the one described in FIG. 11.

The pixel arrays shown in FIG. 13 are the one described in FIG. 9. When focus detection is performed, the area surrounded by the dashed lines is used as a group, which is defined as a section. The neighboring sections partially overlap with each other. In other words, n-th (n is a positive integer) and (n+1)th sections partially overlap with each other. In this embodiment, vertically arranged 30 sections constitute one focus detection area. This one focus detection area is defined as an AF area as similar to FIG. 11. One section includes 9 pixels SVC, provided for a pupil division in the vertical direction, and 9 pixels SVD provided for the other pupil division. In this embodiment, each output of the 9 pixels SVC is weighted and obtained as 1AF pixel of one image signal (referred to as an image C) for phase difference calculation. Similarly, each output of the 9 pixels SVD is weighted and obtained as 1AF pixel of the other image signal (referred to as an image D) for phase difference calculation.

Figure 14:
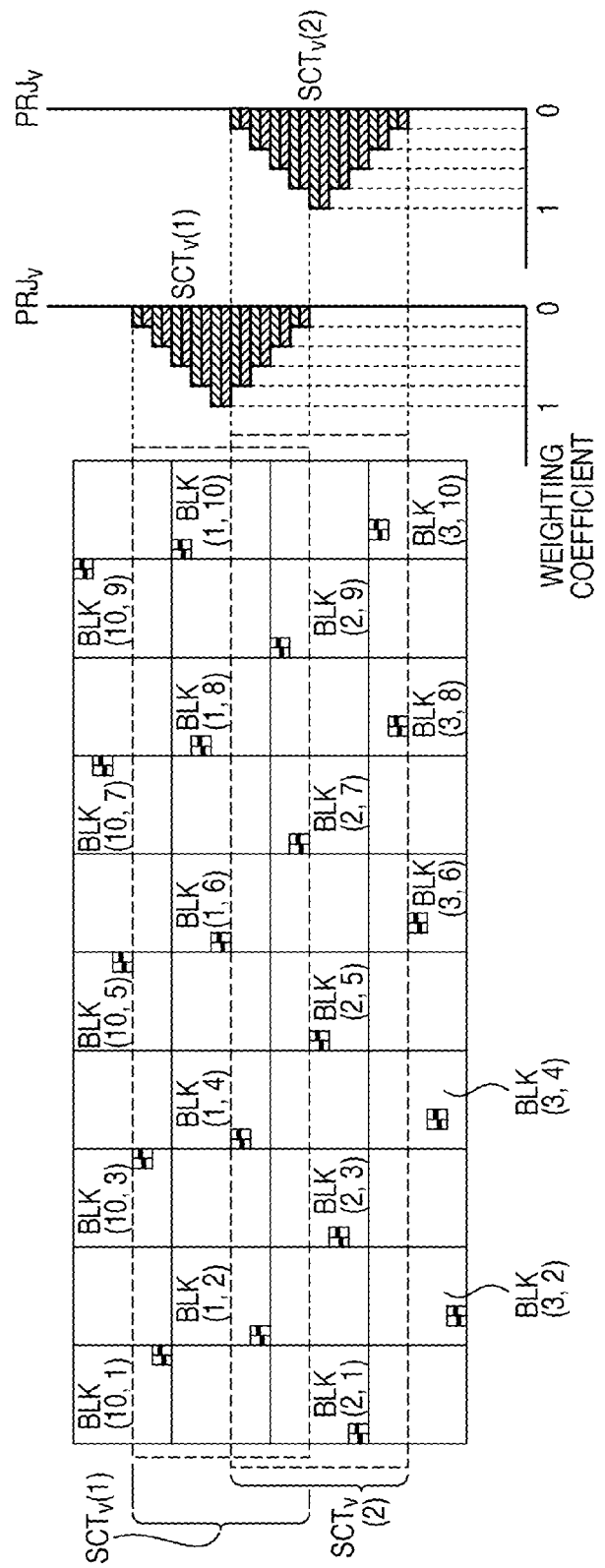
FIG. 14 is an explanatory view of pixel signal weighting coefficient in the longitudinal-deviation focus detection.

FIG. 14 is an explanatory view of the weight addition method in a section. It is equivalent to a 90°-rotated technique of the one described in FIG. 12.

FIG. 14 shows two sections cut out from the top end of the sections in FIG. 13. The vertical line PRJv shown at the right end indicates a weighting coefficient, which corresponds to a projected image signal and the second projection line extending in the pupil-division direction of the focus detection pixels SVC and SVD.

Also in FIG. 14, the weighting coefficient corresponding to each focus detection pixel in the section is larger near the center of the section, while it is smaller in the peripheries. A signal from the focus detection pixel is multiplied by the weighting coefficient, and the multiplication results in the section are integrated. The calculation result of one section is obtained as 1AF pixel signal. For other sections besides the sections SCTv(1) and SCTv(2), similar weighting coefficients are provided, and similar calculation is performed.

Also in FIG. 14, since neighboring sections have partially overlapping focus detection pixels, it is possible to achieve the same effect as the case where a high-frequency component of an object is optically cut.

Figure 15:
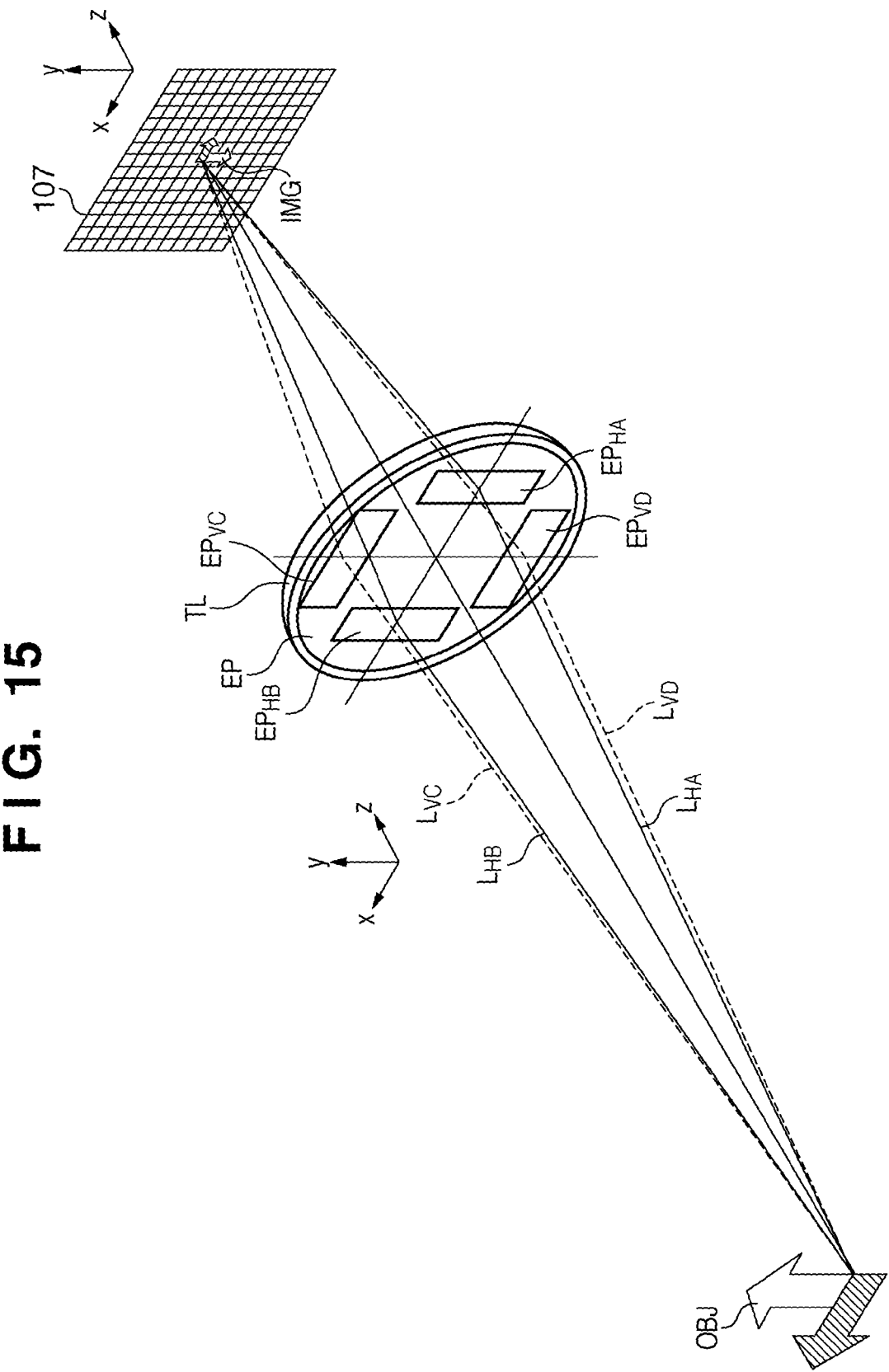
FIG. 15 is a schematic diagram explaining a pupil division state of the image sensor.

FIG. 15 is a schematic diagram explaining a pupil division state of the image sensor according to the present embodiment. Reference letter TL denotes a photographing optical system; numeral 107 denotes an image sensor; OBJ denotes an object; and IMG denotes an object image.

As described with reference to FIGS. 5A and 5B, the image sensing pixels receive light beams that have passed through the entire exit pupil area EP of the photographing optical system. Meanwhile, the focus detection pixels have a pupil division function as described with reference to FIGS. 6A, 6B, 7A and 7B. More specifically, the pixel SHA in FIGS. 6A and 6B receives a light beam that has passed through the left pupil, when it is seen from the image sensing surface to the back end of the lens, in other words, the light beam that has passed through the pupil EPHA in FIG. 15. Similarly, the pixels SHB, SVC, and SVD receive light beams that have passed through the pupil EPHB, EPVC, and EPVD respectively. Since the focus detection pixels are distributed throughout the entire area of the image sensor 107 as described in FIG. 10, focus detection can be performed in the entire image sensing area.

Figure 16:
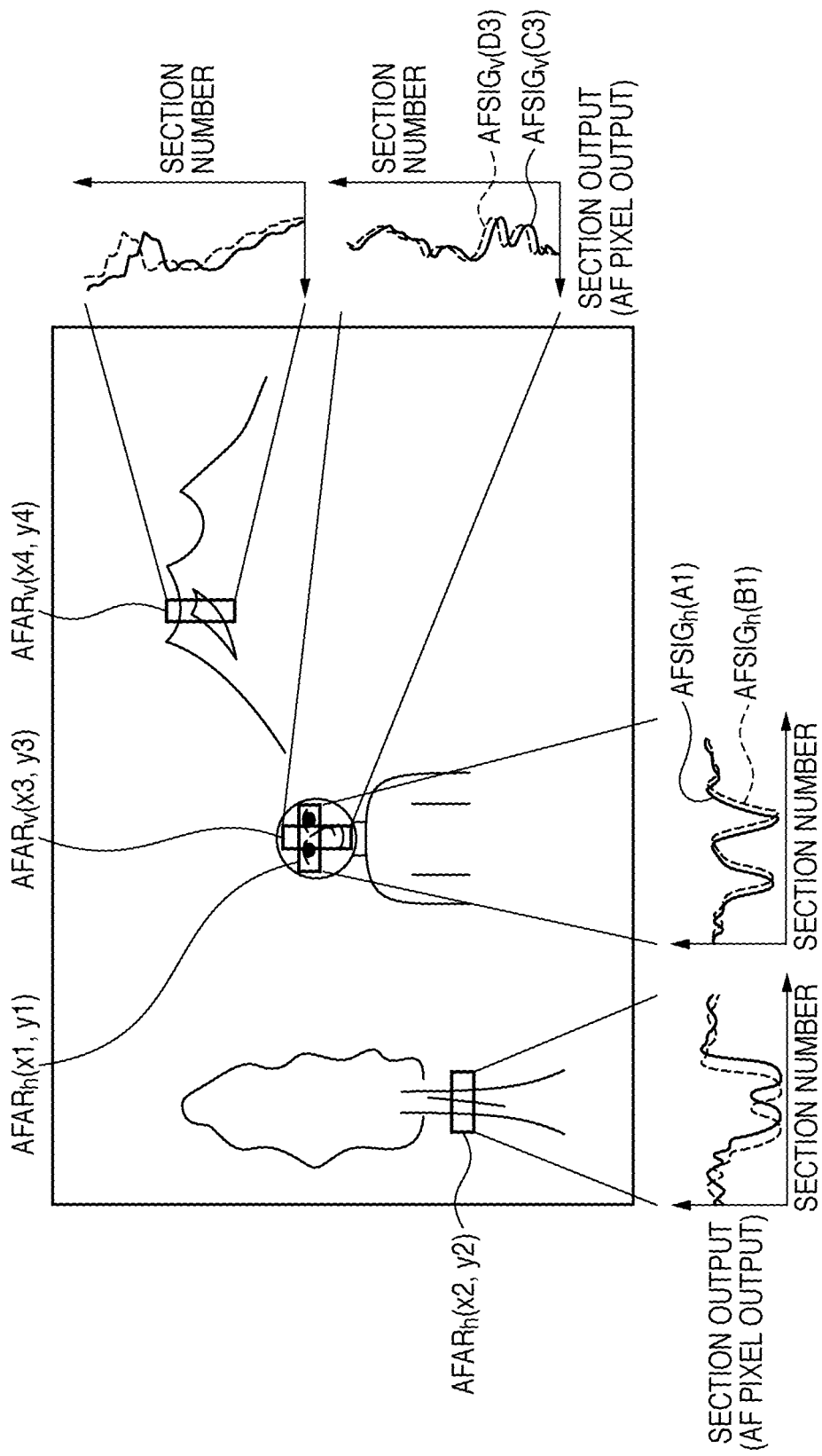
FIG. 16 is an explanatory view of a focus detection area.

FIG. 16 is an explanatory view of an image acquired at the time of focus detection, and a focus detection area.

In FIG. 16, the object image formed on the image sensing surface includes a person in the middle, a tree on the left at a near distance, and mountains on the right at a far distance. For the focus detection pixels in this embodiment, a pair of pixels SHA and SHB for lateral-deviation detection and a pair of pixels SVC and SVD for longitudinal-deviation detection are arranged throughout the entire image sensing area at uniform density as shown in FIG. 10. In lateral-deviation detection, AF pixel signals for phase difference calculation are grouped as shown in FIGS. 11 and 12. In longitudinal-deviation detection, AF pixel signals for phase difference calculation are grouped as shown in FIGS. 13 and 14. Therefore, a focus detection area for lateral-deviation detection and longitudinal-deviation detection can be set at any arbitrary position of an image sensing area.

In FIG. 16, there is a person's face in the center of the screen. When an existence of a face is recognized by a well-known face recognition technique, a focus detection area AFARh (x1, y1) for lateral-deviation detection and a focus detection area AFARv (x3, y3) for longitudinal-deviation detection are set in the face area as a center. Herein, the suffix h indicates the horizontal direction, and (x1, y1) and (x3, y3) indicate coordinates of the top left corner of the focus detection area. 9 focus detection pixels SHA which are included in each section of the focus detection area AFARh (x1, y1) are weighted, and 30 weighted pixels are connected to obtain an A-image signal AFSIGh (A1) for phase difference detection. Similarly, 9 focus detection pixels SHB which are included in each section are weighted, and 30 weighted pixels are connected to obtain a B-image signal AFSIGh (B1) for phase difference detection. A relative lateral-deviation amount between the A-image signal AFSIGh (A1) and the B-image signal AFSIGh (B1) is calculated by a well-known correlation calculation, thereby obtaining a focus-deviation amount (defocus amount) of an object.

A defocus amount is similarly obtained with respect to the focus detection area AFARv (x3, y3). The two defocus amounts, which have been detected in the lateral-deviation focus detection area and the longitudinal-deviation focus detection area, are compared, and a value with higher reliability may be employed.

Meanwhile, the tree trunk located on the left side of the screen mainly has vertical-line components, in other words, has a brightness distribution in the horizontal direction. For this reason, the object is determined to be appropriate for lateral-deviation detection. Therefore, a focus detection area AFARh (x2, y2) for lateral-deviation detection is set. The mountain ridge located on the right side of the screen mainly has horizontal-line components, in other words, has a brightness distribution in the vertical direction. For this reason, the object is determined to be appropriate for longitudinal-deviation detection. Therefore, a focus detection area AFARv (x4, y4) for longitudinal-deviation detection is set.

As has been described above, according to the present embodiment, since a focus detection area for lateral-deviation and longitudinal-deviation detection can be set at any arbitrary position of the screen, it is possible to realize consistently accurate focus detection even if the projection position of an object or the directional character of the brightness distribution vary.

Figure 17:
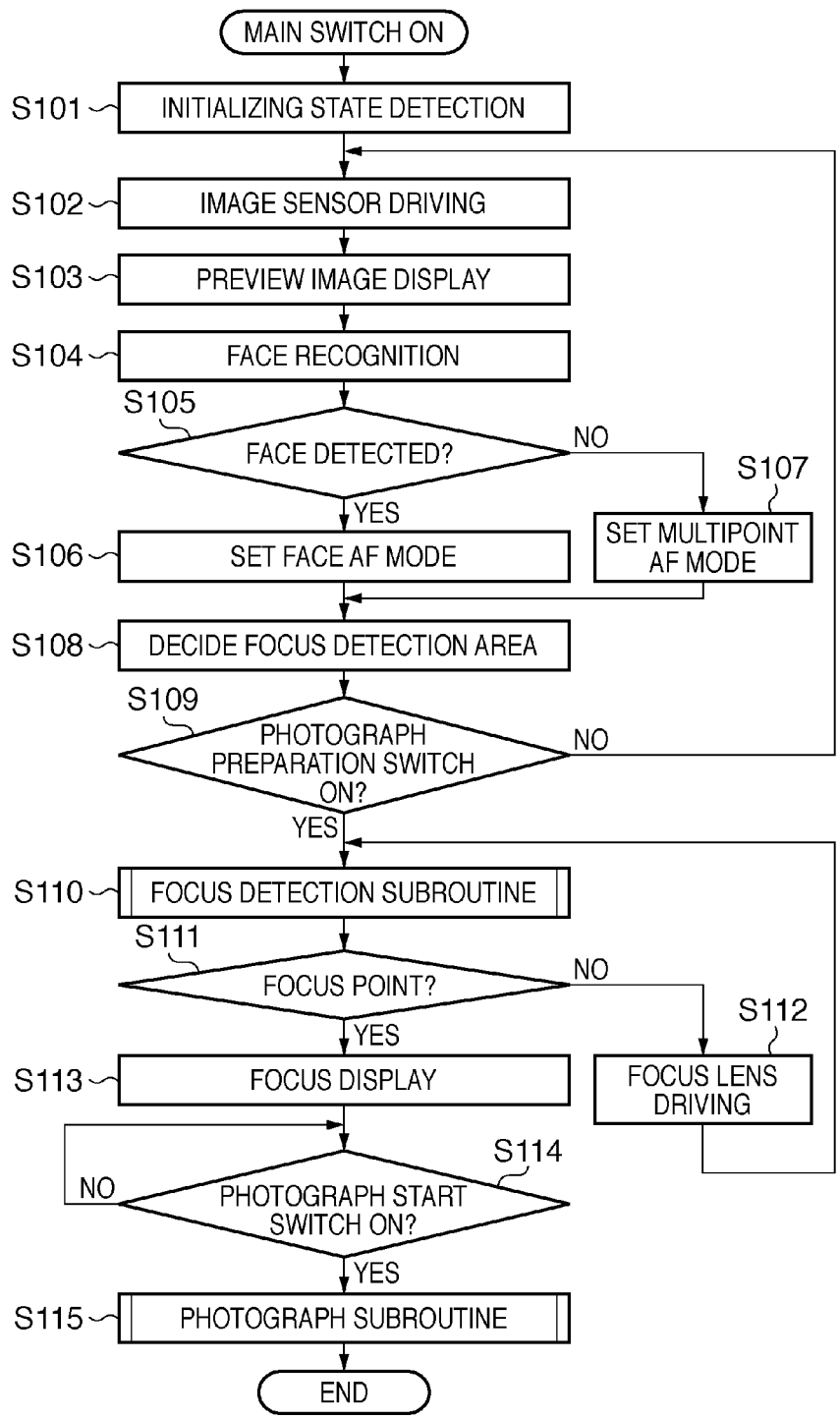
FIG. 17 is a main control flowchart of a digital camera according to an embodiment of the present invention.
Figure 18:
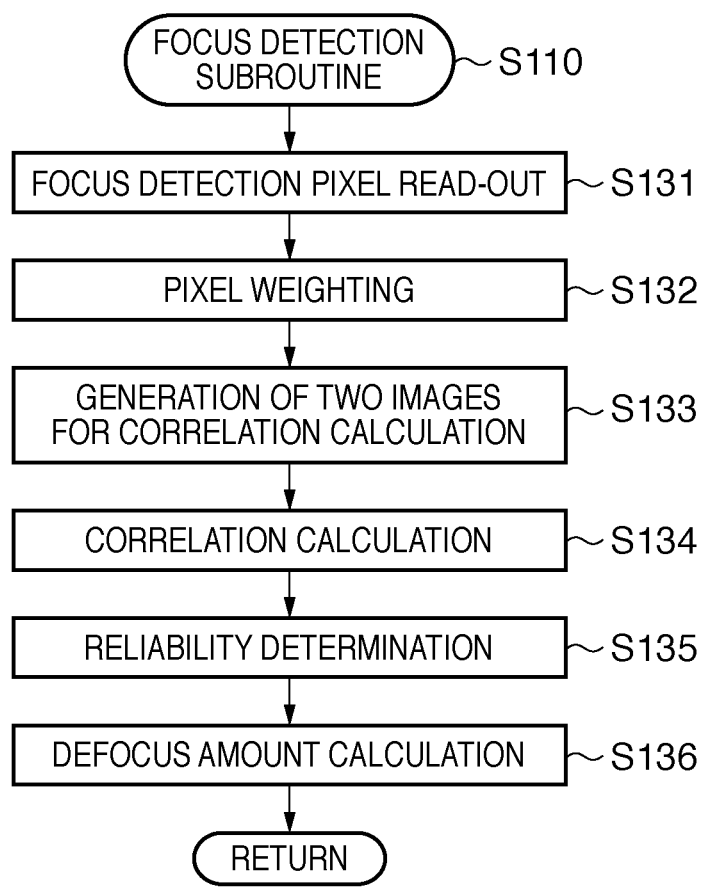
FIG. 18 is a flowchart of a focus detection sub-routine.
Figure 19:
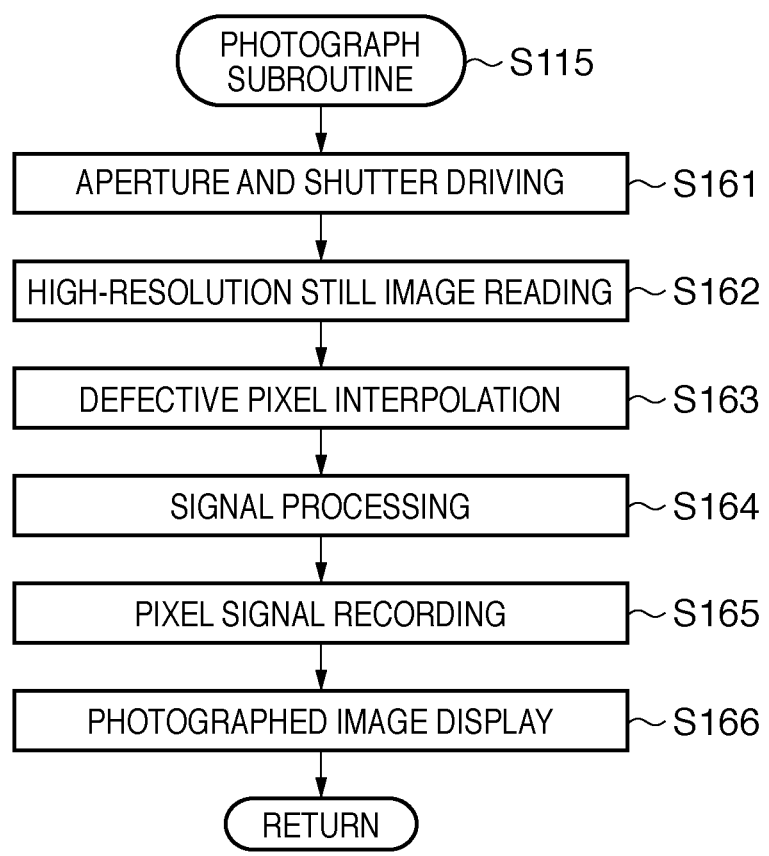
FIG. 19 is a flowchart of a photographing sub-routine.

FIGS. 17 to 19 are flowcharts for describing camera focusing and photographing steps according to the present embodiment. The control flows in FIGS. 17 to 19 are described with reference to the aforementioned drawings FIGS. 1 to 16.

FIG. 17 is a main flow of the camera according to the present embodiment.

When a photographer turns on the camera's power switch, in step S101 the CPU 121 performs operation confirmation of each actuator and the image sensor of the camera, performs initializing of the memory contents and execution programs, and performs the photograph preparation operation. In step S102, image sensing operation of the image sensor starts, and a low-resolution moving image is outputted for preview. In step S103, the read moving image is displayed on the display 131 provided on the camera's back surface. The photographer looks at the preview image and decides the composition for taking a photograph.

In step S104, whether or not a face exists in the preview moving image is recognized. When it is recognized that a face exists in the photograph area, the control proceeds from step S105 to S106 where the focusing mode is set in a face autofocus (AF) mode. Herein, the face AF mode indicates an AF mode for focusing on the face in the photograph area.

Meanwhile, if a face does not exist in the photograph area, the control proceeds from step S105 to S107 where the focusing mode is set in a multipoint AF mode. The multipoint AF mode is a mode in which the photograph area is divided into, e.g., 3×5=15 areas for performing focus detection in each of the divided areas, the main object is analogized based on the focus detection result and brightness information of the object, and the main object area is focused.

After the AF mode is decided in step S106 or S107, a focus detection area is decided in step S108. In step S109, it is determined whether or not a photograph preparation switch turn-on operation is performed. If the turn-on operation is not performed, the control returns to repeat the control from the image sensor driving in step S102 to the focus detection area decision in step S108.

When the photograph preparation switch turn-on operation is performed in step S109, in step S110 a focus detection subroutine is executed.

FIG. 18 is a flowchart of the focus detection subroutine.

When the control proceeds from step S109 of the main flow to step S110 of the subroutine, focus detection pixels included in the focus detection area, which has been decided in step S108 of the main routine, are read in step S131.

In step S132, signals from the focus detection pixels included in each section of the focus detection area are weighted using the method described in FIG. 12 or FIG. 14, thereby obtaining AF pixel signals.

In step S133, signals of two images for correlation calculation are obtained based on the calculation result in step S132. More specifically, a pair of signals, e.g., AFSIGh (A1) and AFSIGh (B1), or AFSIGv (C3) and AFSIGv (D3) shown in FIG. 16 are created.

A correlation calculation of the obtained two images is performed in step S134 to calculate a relative positional deviation amount of the two images. In step S135, reliability of the correlation calculation result is determined. Herein, reliability indicates a coincidence level of the two images.

When the coincidence level of the two images is high, reliability of the focus detection result is generally high. When a plurality of focus detection areas are selected, information with high reliability is preferentially used.

In step S136, a defocus amount is calculated based on the above-described detection result with high reliability, and the control returns to step S111 in the main flow of FIG. 17.

In step S111 in FIG. 17, it is determined whether or not the defocus amount calculated in step S136 in FIG. 18 is equal to or lower than an allowable value. If the defocus amount is equal to or higher than the allowable value, it is determined that the object is defocused. In step S112, the focus lens is driven, and thereafter steps S110 to S112 are repeatedly executed. When it is determined in step S111 that a focused state is achieved, the focused state is displayed in step S113, and the control proceeds to step S114.

In step S114, it is determined whether or not a photograph start switch turn-on operation is performed. If the switch turn-on operation is not performed, a photograph standby state is maintained in step S114. When the switch turn-on operation is performed in step S114, the control proceeds to step S115 to execute a photograph subroutine.

FIG. 19 is a flowchart of the photograph subroutine.

When the photograph start switch is operated, the control proceeds to step S115. In step S161, a light-amount adjusting aperture is driven to perform aperture control of the mechanical shutter which defines the exposure time. In step S162, image reading for high-resolution still-image photographing, in other words, all-pixel reading is performed. In step S163, defective pixel interpolation of the read image signals is performed. More specifically, since an output of the focus detection pixel does not have R, G and B color information, it is considered as a defective pixel in image acquisition. For this reason, an image signal is created by interpolation based on the information of the peripheral image sensing pixels.

In step S164, image processing such as γ correction, edge emphasis and the like is performed. In step S165, the photograph image is recorded in the memory 133. In step S166, the photographed image is displayed on the display 131, and the control returns to the main flow in FIG. 17.

When the control returns to the main flow in FIG. 17, the series of photograph operation ends.

As has been set forth above, according to the present embodiment, the following effects can be achieved.

As described in step S132, focus detection pixels included in each section of the focus area are weighted to obtain AF pixels. Furthermore, in neighboring sections, the weighting coefficients are set in a way that part of the focus detection pixels included in the section overlap with each other. For this reason, object image signals formed with the calculated AF pixel signals have an effect in which a high-frequency component is optically cut. Therefore, it is possible to reduce errors in a focus detection result caused by a high-frequency component of an object.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-192685, filed Jul. 25, 2008, which is hereby incorporated by reference herein in its entirety.

The invention claimed is:

1. A focus detection apparatus comprising:
    an image sensor configured to convert an object image, said image sensor having image sensing pixels for generating an image to be recorded or displayed, and focus detection pixels discretely arranged at predetermined intervals between the image sensing pixels for receiving a light beam that has passed through a partial area, which is a division of an exit pupil of an optical system for forming an object image;
    an addition unit configured to multiply outputs of a plurality of said focus detection pixels included in a predetermined area of the image sensor by a weighting coefficient corresponding to a position of the focus detection pixel, and perform addition; and
    a defocus amount calculation unit configured to calculate a defocus amount based on a pair of phase-difference detection signals generated based on an output of said addition unit,
    wherein said addition unit multiplies the output of each of the plurality of focus detection pixels arranged in a direction perpendicular to a phase-difference detection direction by the weighting coefficients corresponding to the positions of the plurality of focus detection pixels in the phase-difference detection direction, and performs the addition.

2. The focus detection apparatus according to claim 1, wherein said image sensor includes a plurality of the predetermined areas,
    wherein neighboring areas of the predetermined areas have partially overlapping focus detection pixels and
    wherein said addition unit performs multiplication by the respective weighting coefficient, which is set in advance in a way that a n-th signal (n is a positive integer) of the phase-difference detection signal, and neighboring (n−1)th and (n+1)th signals overlap with each other, and performs addition.

* * * * *